United States Patent

Carter

[15] 3,694,019

[45] Sept. 26, 1972

[54] SINGLE USE INERTIA ABSORBING DEVICE

[72] Inventor: John Ed Carter, Columbia, S.C.

[73] Assignee: Allied Chemical Corporation, New York, N.Y.

[22] Filed: Nov. 23, 1970

[21] Appl. No.: 91,705

[52] U.S. Cl. ............... 293/101, 188/1 C, 293/87, 293/88, 293/89

[51] Int. Cl. ............................................. F16f 7/12

[58] Field of Search ....... 188/1 C; 293/70, 72, 89, 87, 293/88, 101, DIG. 3

[56] References Cited

UNITED STATES PATENTS

| | | |
|---|---|---|
| 1,540,945 | 6/1925 | Miller ................... 293/89 |
| 2,465,936 | 3/1949 | Schultz ............. 188/1 C UX |
| 2,578,903 | 12/1951 | Smith .................. 188/1 C |
| 2,837,176 | 6/1958 | Dropkin .................. 188/1 C |
| 2,933,127 | 4/1960 | Brewster ............. 188/1 C X |
| 3,074,760 | 1/1963 | Hodgekin ........... 188/1 C UX |

FOREIGN PATENTS OR APPLICATIONS 297,844 12/1929 Great Britain ............... 293/89

Primary Examiner—Duane A. Reger
Attorney—Richard A. Anderson

[57] ABSTRACT

An inertia absorbing device is disclosed to absorb relatively large amounts of inertial energy on a one shot or single use basis. Energy is absorbed by elongating or stretching a thermoplastic structure, such as nylon yarn. One example of an end use would be an energy absorbing system for automobile bumpers to prevent low speed (5–10 mph) collision damage. Nylon yarn is attached to pins between a movable bumper mount and the automobile frame, to be stretched on collision.

10 Claims, 1 Drawing Figure

PATENTED SEP 26 1972
3,694,019
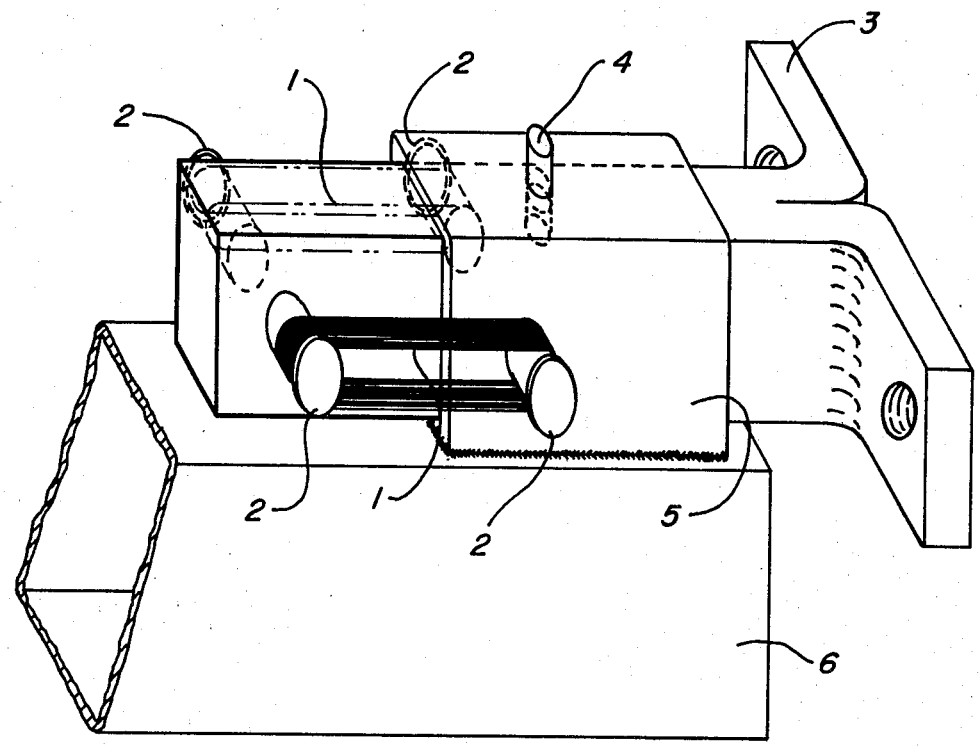
INVENTOR.
John E. Carter
BY
Richard A. Anderson
ATTORNEY

SINGLE USE INERTIA ABSORBING DEVICE

BACKGROUND OF THE INVENTION

This invention relates to a single use inertia absorbing device by elongating or stretching thermoplastic structures.

Prior art presently consists of water filled bumpers and hydraulic shock absorbers costing up to $60 per bumper. All prior art is in development, and no automobile manufacturer has yet introduced a system. Insurance companies have conducted tests where 5 mph collisions result in $200 to $300 damage and $500 or more at 10 mph on all American cars. An energy absorbing bumper would reduce these high cost, low speed collisions, possibly decreasing rates for collision insurance.

SUMMARY OF THE INVENTION

The basic idea of this invention is to use the energy necessary to align the molecules in certain synthetic thermoplastic materials from a random orientation to an orientation along an axis of elongation. This energy is necessary to overcome intermolecular friction, i.e., the resistance of the molecules to slip past each other to become realigned along an axis rather than in random orientation. The material for this invention must be capable of being permanently highly elongated. Broadly, the invention is a single use inertial absorbing device utilizing a length of energy absorbing non-elastic material, which is drawable to a permanent elongation, attached at one end to a fixed support and attached at the other end to a movable member. The movable member is mounted to contact a moving object so that upon contact the inertia of the moving object is absorbed by stretching the energy absorbing non-elastic material between the fixed support and the movable member. This can be accomplished by winding a skein of undrawn yarn around the pins mounted on the fixed support and movable members or by mounting multiple layers of undrawn film wound around the pins of the fixed support and movable member. The material for this invention can be any energy absorbing non-elastic material which is capable of becoming permanently elongated. Many of the man-made or synthetic polymers have molecules arranged in a randomly oriented crystalline structure suspended in a matrix of amorphous molecules as first formed during manufacture and prior to any molecular orientation caused by drawing or stretching of the polymer. Typical of such drawable, orientable, randomly oriented crystalline and amorphous molecular materials are the polyamides, polyolefins and polyvinylchloride. Typical polyamides would be polycaprolactam, polyhexamethylene adipamide and the entire family of polymers prepared by polymerizing a dicarboxylic acid with a diamine or self-polymerizing monocarboxylic-monoamino acids or their derivatives such as lactams. Typical polyolefins would be polyethylene or polypropylene. In a few applications, even polymers like the polyesters could possibly be used if sufficient heat were present to allow drawability of the polymer. The physical embodiment of the polymer may be as undrawn multifilament yarn, undrawn monofilament, undrawn strands or undrawn film. The amount of energy absorption by the polymer material can easily be controlled by the quantity of yarn, monofilament strands or film attached to the fixed and movable elements. In other words, the amount of cross section subject to elongation can be varied by changing the number of wraps around pins or the number of pieces of material between attaching means. By yarn is meant filaments having a diameter of from about 0.0001 to 0.02 inch. By strands is meant large filaments having a diameter of from about 0.02 to a diameter which would shear rather than draw, possibly up to 5 inches.

A more specific summary of this invention would be a single use or one shot energy absorbing device for an automobile bumper to prevent low speed collision damage wherein a skein of undrawn strands or multiple layers of undrawn film of a material such as polyamide attached at one end to the automobile frame and attached at the other end to a slidable bumper mounting member so that upon low speed collision the yarn or film is stretched between the slidable bumper mounting member and the frame to absorb energy of the collision.

BRIEF DESCRIPTION OF THE DRAWING

FIG. 1 is an isometric view of a specific embodiment for use between an automobile bumper and frame.

PREFERRED EMBODIMENTS

A preferred embodiment of this invention is shown in FIG. 1. Strands 1 of nylon or polyolefin are wound skein fashion around metal pins 2 which are attached to automobile bumper 3 and frame 6. A box section support 5 with shear pin 4 is used to support the assembly. The shear pin is designed to shear at 1 to 2 miles per hour. The quantity of energy absorption by the strands after the shear pin shears is easily controlled by the changing quantity of polyamide or polyolefin, i.e., number of strands and can be easily adjusted for vehicle weight, desired travel and velocity. Approximate force to elongate polycaproamide is 2,600 psi so that nominal amounts of undrawn polymer can provide substantial absorption. Polyamide has the property of being capable of elongation to 700 percent before rupture and does so with constant energy absorption rate. A system of 4 inches in total cross sectional area will stop a vehicle weighing 4,000 pounds from 5 mph in 3½ inches. This is well within the design esthetics for bumper protrusion, travel distance, and would result in no damage other than to the bumper and the thermoplastic skeins, which are simple and inexpensive to replace.

EXAMPLE

In the laboratory, a 10 pound weight was arrested by a polycaproamide structure from a freefall at 5.0 mph in 4.0 and 4.75 inches in two trials. The structure required 20 pounds to elongate, 2,600 psi tension. It is calculated that this test run horizontally, i.e., pendulum arrest, would require 3.5 inches since the acceleration of gravity is avoided on horizontal basis.

I claim:

1. A single use energy absorbing device for an automobile bumper to prevent low speed collision damage comprising a length of energy absorbing, non-elastic material which is cold drawable to a permanent elongation, attached at one end to the automobile frame and attached at the other end to a slidable bumper mounting member secured with a shear pin in an open-ended box-type support, said shear pin being securely seated in said slidable member and passing through a mated opening in said support so that upon low speed collision said material is stretched between said slidable bumper mounting member and said frame to absorb the energy of said collision.

2. The device of claim 1 wherein said material is a skein of undrawn yarn.

3 The device of claim 1 wherein said material is a multiple layer of undrawn film.

4. The device of claim 2 wherein said yarn is polyamide.

5. The device of claim 2 wherein said yarn is polypropylene.

6. The device of claim 3 wherein said film is polyethylene.

7. The device of claim 4 wherein said polyamide is polycaproamide.

8. The device of claim 3 wherein said film is polypropylene.

9. The device of claim 1 wherein the material is a strand.

10. The device of claim 9 wherein said strand is polyamide.

* * * * *